United States Patent
Lu et al.

(10) Patent No.: US 12,267,988 B2
(45) Date of Patent: Apr. 1, 2025

(54) THERMAL CONTROL OPTIMIZATION BASED ON MONITORING/CONTROL MECHANISM

(71) Applicant: Alibaba Group Holding Limited, Grand Cayman (KY)

(72) Inventors: Yijun Lu, Hangzhou (CN); Jun Song, Tacoma, WA (US); Youquan Feng, Beijing (CN)

(73) Assignee: Alibaba Group Holding Limited, Grand Cayman (KY)

( * ) Notice: Subject to any disclaimer, the term of this patent is extended or adjusted under 35 U.S.C. 154(b) by 776 days.

(21) Appl. No.: 17/294,996

(22) PCT Filed: Nov. 19, 2018

(86) PCT No.: PCT/CN2018/116150
§ 371 (c)(1),
(2) Date: May 18, 2021

(87) PCT Pub. No.: WO2020/102931
PCT Pub. Date: May 28, 2020

(65) Prior Publication Data
US 2022/0007549 A1    Jan. 6, 2022

(51) Int. Cl.
*H05K 7/20* (2006.01)
*G06F 1/20* (2006.01)
(Continued)

(52) U.S. Cl.
CPC ......... *H05K 7/20836* (2013.01); *G06F 1/206* (2013.01); *G06F 30/20* (2020.01);
(Continued)

(58) Field of Classification Search
CPC  H05K 7/20836; H05K 7/20745; G06F 1/206; G06F 30/20; G06F 2111/10; G06F 2119/08
See application file for complete search history.

(56) References Cited

U.S. PATENT DOCUMENTS

| | | |
|---|---|---|
| 7,979,250 B2 | 7/2011 | Archibald et al. |
| 8,001,403 B2 | 8/2011 | Hamilton et al. |
| | (Continued) | |

FOREIGN PATENT DOCUMENTS

| | | |
|---|---|---|
| CN | 102213475 A | 10/2011 |
| CN | 102621945 A | 8/2012 |
| | (Continued) | |

OTHER PUBLICATIONS

Yuan, Y., Lee, E. K., Pompili, D., & Liao, J. (2012). Thermal anomaly detection in datacenters. Proceedings of the Institution of Mechanical Engineers, Part C: Journal of Mechanical Engineering Science, 226(8), 2104-2117. (Year: 2012).*

(Continued)

*Primary Examiner* — Bijan Mapar
(74) *Attorney, Agent, or Firm* — Lee & Hayes, P.C.

(57) ABSTRACT

Apparatus and methods are provided for improving thermal control, including collecting data of a plurality of systems, each of the plurality of systems including at least one first cooling element and at least one first heat-generating element; conducting a first simulation using a simulation model based on the collected data to generate a first set of simulation results; conducting a first training on a control system using the first set of simulation results to obtain a first trained control system; and using the first trained control system to monitor a field system with a space having at least one second cooling element and at least one second heat-gener- (Continued)

ating element and to control the at least one second cooling element and the at least one second heat-generating element.

20 Claims, 7 Drawing Sheets

(51) Int. Cl.
  *G06F 30/20* (2020.01)
  *G06F 111/10* (2020.01)
  *G06F 119/08* (2020.01)
(52) U.S. Cl.
  CPC ...... *H05K 7/20745* (2013.01); *G06F 2111/10* (2020.01); *G06F 2119/08* (2020.01)

(56) References Cited

U.S. PATENT DOCUMENTS

| | | | |
|---|---|---|---|
| 8,744,812 | B2 | 6/2014 | Cruz |
| 8,996,193 | B2 | 3/2015 | Manzer |
| 9,158,311 | B2 | 10/2015 | Geissler et al. |
| 9,459,633 | B2 | 10/2016 | Geissler et al. |
| 10,034,417 | B2 | 7/2018 | Billet et al. |
| 10,114,353 | B2 | 10/2018 | Slessman |
| 10,467,021 | B2 | 11/2019 | Nguyen et al. |
| 11,228,484 | B2 | 1/2022 | Palmer et al. |
| 2010/0033922 | A1 | 2/2010 | Zwinger et al. |
| 2011/0213508 | A1* | 9/2011 | Mandagere ............ G06F 9/5088 700/291 |
| 2012/0245905 | A1 | 9/2012 | Dalgas et al. |
| 2013/0006426 | A1 | 1/2013 | Healey et al. |
| 2015/0220669 | A1 | 8/2015 | Linehan et al. |
| 2015/0370937 | A1 | 12/2015 | Liu et al. |
| 2016/0050797 | A1 | 2/2016 | Smith |
| 2016/0371405 | A1 | 12/2016 | Raczynski et al. |
| 2017/0017281 | A1 | 1/2017 | Artman et al. |
| 2017/0187592 | A1 | 6/2017 | Ghosh et al. |
| 2019/0235449 | A1 | 8/2019 | Slessman et al. |

FOREIGN PATENT DOCUMENTS

| | | |
|---|---|---|
| CN | 103309321 A | 9/2013 |
| CN | 107291973 A | 10/2017 |
| CN | 107885762 A | 4/2018 |
| CN | 108364098 A | 8/2018 |
| CN | 108573090 A | 9/2018 |

OTHER PUBLICATIONS

PCT International Search Report & Written Opinion for Application No. PCT/CN20118/116150, mailed on Aug. 19. 2019, 7 pages.
Chinese Office Action for related Chinese Patent Application No. CN 201880099629, dated Jun. 25, 2023, 3 pages.
Chinese Search Report of related Chinese Patent Application No. CN 201880099629, dated Jun. 25, 2023, 1 page.
Zhi-Hong et al., "System of Refrigeration Simulation for Practice," available at «https://www.cnki.net/KCMS/detail/detail.aspx?dbcode=CJFD&dbname=CJFD2004&filename=JSJZ200410057&uniplatform=OVERSEA&v=invW_BZGCfbKy0W_rSJoiHOG_mS1n7_lybMUT1EAB2g-sNMTc3GZgACoFU8_n5_1», 8 pages.

* cited by examiner

200

FROM 212

CONDUCT A SECOND ROUND OF TRAINING ON THE MONITORING/CONTROL MECHANISM
214

USE THE TRAINED MONITORING/CONTROL MECHANISM TO OPTIMIZE THE THERMAL CONTROL OF A FIELD SYSTEM
216

SEND FEEDBACK TO THE MONITOR/CONTROL MECHANISM FROM THE FIELD SYSTEM
218

UPDATE/TUNE THE MONITORING/CONTROL MECHANISM USING THE FEEDBACK
220

SEND FEEDBACK TO OTHER PARTIES
222

THERMAL CONTROL OPTIMIZATION BASED ON MONITORING/CONTROL MECHANISM

This application claims priority to and is a national stage application, filed under 35 U.S.C. § 371, of International Patent Application No. PCT/CN2018/116150, filed on Nov. 19, 2018, which is incorporated herein by reference.

BACKGROUND

Regarding operational expenditure (OpEx) of an Internet Data Center (IDC), the power consumption of power servers and IDC equipment, the cooling of devices, etc. may account for about half of the total OpEx. In recent years, the cooling cost has become a dominant factor of the OpEx of the IDC. Hence, thermal control optimization, i.e., cooling mechanism optimization, has become an imperative task to be addressed.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
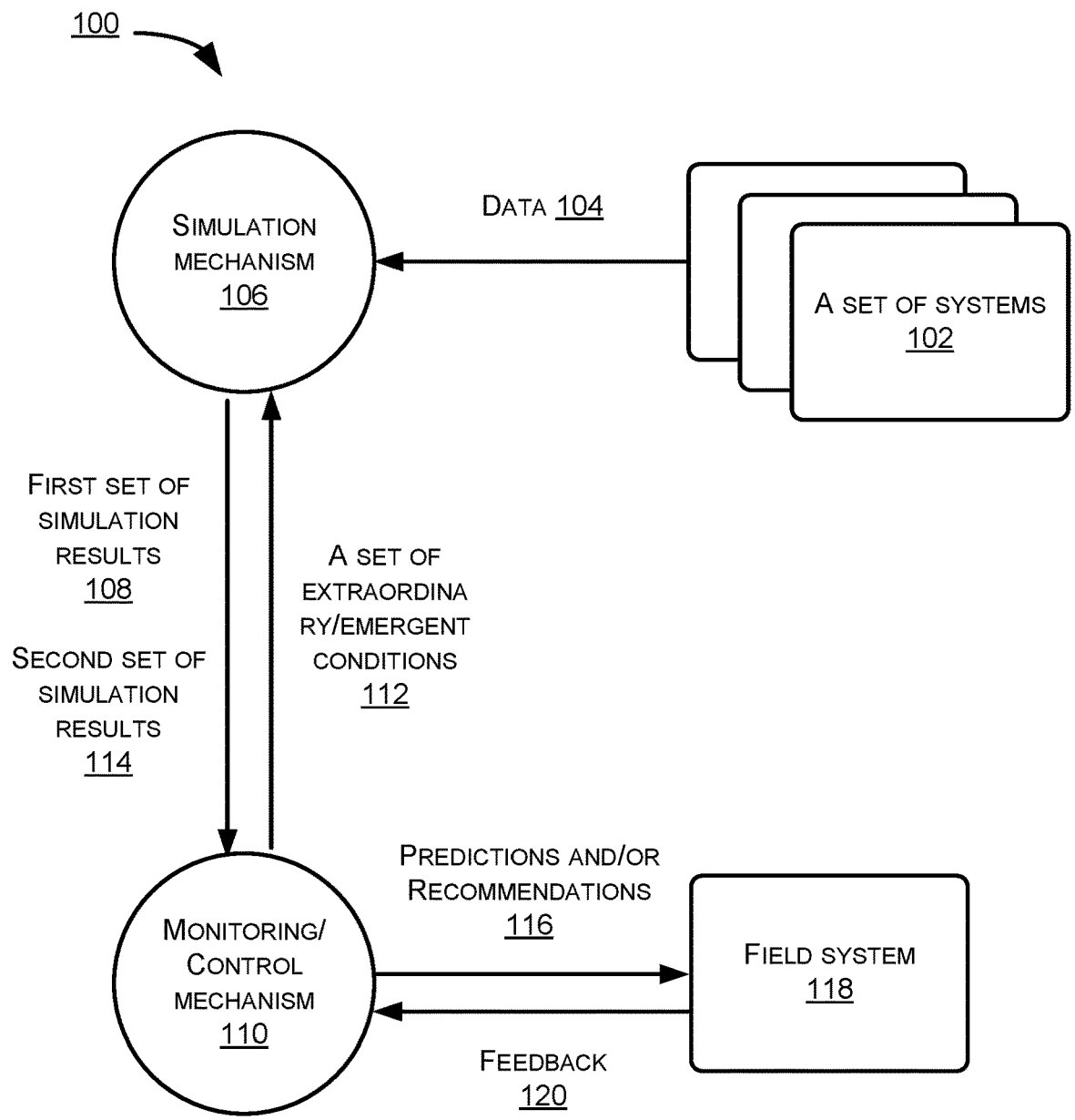
FIG. 1 illustrates an example block diagram of a monitoring/control mechanism which may be used for thermal control optimization of a field system.

Systems and processes discussed herein are directed to improving thermal efficiency, and more specifically to improving real-time and multi-dimensional thermal control optimization based on a monitoring/control mechanism.

Fluid dynamics, such as Computational Fluid Dynamics (CFD), is a branch of fluid mechanics that uses numerical analysis and data structures to analyze and solve problems that involve fluid flows. CFD analysis may be used to conduct thermal control optimization. For example, a CFD model of a system may be built up and calibrated according to actual data. Then, the simulation may run on the CFD model to generate results to guide the hardware design, the component layout, etc. to improve the thermal efficiency of the system. However, the CFD analysis is labor-intensive and costly. Many entities with the IDC setting only can afford to conduct the CFD analysis occasionally, for example, once a year. Some small entities even cannot conduct the CFD analysis at all.

Moreover, conducting the CFD analysis may have the following drawbacks. First, the condition of servers and IDC facility equipment may change over time. Conducting the CFD occasionally like once a year may lose opportunities to improve the thermal control in an ongoing manner. Second, the IDC may not be subject to extraordinary/emergent conditions at the time when the CFD is conducted. For example, the unusual heat scenario may occur once in a few years, or the air conditioner may break down unpredictably. The data or results generated by a single time of CFD analysis may miss many extraordinary/emergent scenarios, resulting in an incomplete model.

In view of the issues discussed above, there is no economically viable solution to conduct thermal control optimization for the IDC in a real-time manner with multi-dimensional consideration, neither is there extraordinary/emergent conditions incorporated into the simulation model. Multi-dimensional consideration may refer to taking extraordinary/emergent conditions into consideration, which may be discussed in detail hereinafter.

Systems and processes discussed herein may be used for multi-dimensional thermal control optimization based on a monitoring/control mechanism. In implementations, the thermal control optimization may be performed in real time or on regular basis. Data of a plurality of systems may be collected. Each of the plurality of systems may include at least one first cooling element and at least one first heat-generating element. A first simulation may be conducted using a simulation model based on the collected data to generate a first set of simulation results. A control system may be provided. A first training may be conducted on the control system using the first set of simulation results to obtain a first trained control system. The first trained control system may be used to monitor a field system with a space having at least one second cooling element and at least one second heat-generating element and to control the at least one second cooling element and the at least one second heat-generating element. Additionally, or alternatively, the first trained control system may be used to provide recommendations to the field system for controlling the at least one second cooling element and the at least one second heat-generating element.

A set of conditions may be generated using the first trained control system. The set of conditions may be sent to the simulation model. A second simulation may be conducted using the simulation model based on the set of conditions to obtain a second set of simulation results. A second training may be conducted on the first trained control system using the second set of simulation results to obtain a second trained control system. The second trained control system may be used to monitor the field system with the space having the at least one second cooling element and the at least one second heat-generating element and to control the at least one second cooling element and the at least one second heat-generating element. Additionally, or alternatively, the first trained control system may be used to provide recommendations to the field system for controlling the at least one second cooling element and the at least one second heat-generating element.

Feedback data may be sent from the field system with the space having the at least one second cooling element and the at least one second heat-generating element. The second trained control system may be updated by conducting a third training on the second trained control system using the feedback data.

The simulation model may be a Computational Fluid Dynamics (CFD) model. The first set of simulation results may include a first set of thermal maps and/or airflow maps, and the second set of simulation results includes a second set of thermal maps and/or airflow maps.

Each of the plurality of systems may include one or more CPUs, one or more computing devices, one or more servers, one or more racks of servers and/or computing devices, and one or more Internet Data Centers (IDCs).

The control system may include Convolutional Neural Networks (CNN), Recurrent Neural Networks (RNN), Long Short-Term Memory networks (LSTM), Reinforcement learning (RL) networks, Machine Learning (ML) networks, Deep Learning (DL) networks, a decision tree, and any combination thereof.

Terminologies throughout the context may be denoted as follows. IDC may include both IT devices and IDC facility equipment. IT Resources may refer to a variety of computing devices including computing nodes, storage devices, network devices, etc. IDC facility equipment may refer to shared infrastructure equipment in the IDC, including air conditioning equipment, water pumps, Uninterrupted Power Supply (UPS), fans, etc. Artificial Intelligence (AI) may be used in a general sense, including a wide range of AI models, such as Convolutional Neural Networks (CNN), Recurrent Neural Networks (RNN), Long Short-Term Memory Networks (LSTM), Reinforcement learning (RL) networks, Machine Learning (ML) networks, Deep Learning (DL) networks, and a decision tree.

FIG. 1 illustrates an example block diagram 100 of a monitoring/control system which may be used for thermal control optimization of a field system.

A set of systems 102 comprising a plurality of systems may be provided, where each of the plurality of systems includes at least one cooling element and at least one heat-generating element. Data 104 of the set of systems 102 may be collected. For example, the set of systems 102 may be a set of IDCs. The IDC is used as an example of the numerical systems hereinafter for the sake of description, rather than limiting the application to the IDC. The IDC may have a space including various heat-generating elements and/or cooling elements. Heat-generating elements may include servers, racks, computing nodes, storage devices, network devices, etc. Cooling elements may include air conditioning equipment, water pumps, fans, etc. The data of each of the set of IDCs may include typical settings in terms of a size of a space or room, number of servers, a layout of the space or room, environment temperature, humidity, temperatures at a plurality of points in the space (which may be three dimensional or two dimensional), etc. For example, a big IDC may have 105,000 servers with the room size of about 1000 m². There may be one level for laying out the servers, and another level for laying out the IT devices. A medium IDC may have 10,000 servers with the room size of about 500 m². A small IDC may have 500 servers with the room size of about 200 m². Also, other number of servers and other room sizes may be arranged. An IDC in humid weather may be in Houston. An IDC in cold weather may be in Chicago. An IDC in hot weather may be in Mexico City. Also, IDCs may be in other places and under other weather conditions.

A simulation mechanism 106 such as a CFD model may be provided based on the data 104. The CFD model is used as an example of the numerical methods in fluid mechanics or fluid dynamics hereinafter for the sake of description, rather than limiting the application to the CFD model. The simulation mechanism 106 may run a first simulation to generate a first set of simulation results 108. For example, the simulation mechanism 106 may be established by any suitable software such as Solidworks, Ansys Fluent, and Simscale, based on the size of the space or room, the number of servers, the layout of the space or room, the environment temperature, the humidity, temperatures at a plurality of points in the space (which may be three dimensional or two dimensional), etc. Then, the simulation mechanism 106 may simulate how the airflow interacts with IDC equipment and generate a first set of simulation results 108. The first set of simulation results may include thermal map(s) and/or airflow map(s) of the set of systems 102, showing a three-dimensional or two-dimensional picture of the heat and/or airflow distribution. The CFD model may be deployed on-site in a system or may be located remotely.

A monitoring/control mechanism 110 that is capable of learning and adaptation such as an AI model or a decision tree may be provided. For example, the monitoring/control mechanism 110 may be provided to include Convolutional Neural Networks (CNN), Recurrent Neural Networks (RNN), Long Short-Term Memory networks (LSTM), Reinforcement learning (RL), Machine Learning (ML) networks, Deep Learning (DL) networks, or any combination thereof. The AI model is used as an example of the monitoring/control mechanism hereinafter for the sake of description, rather than limiting the application to the AI model. Also, other suitable monitoring/control mechanisms may be used.

A first round of training of the monitoring/control mechanism 110 may be conducted using the data 104 of the set of systems 102 and/or the first set of simulation results 108. For example, the data 104 of one system of the set of systems 102 may be used as the input of the monitoring/control mechanism 110. Then, the monitoring/control mechanism 110 may predict the thermal map and/or airflow map of the system and where the hot spots/areas and cool spots/areas are. Then, the predicted thermal map and/or airflow map may be compared with the actual thermal map and/or airflow map of the system provided by the first set of simulation results 108 from the simulation mechanism 106. If the predicted thermal map and/or airflow map is not accurate enough, the difference between the predicted thermal map and/or airflow map and the actual thermal map and/or airflow map may be fed back to the input of the monitoring/control mechanism 110 to train the monitoring/control mechanism 110 in an iterative manner until an accuracy of the predicted thermal map and/or airflow map is under a threshold. The threshold of accuracy may be adjusted by the user or the manufacturer as necessary. The first round of training of the monitoring/control mechanism 110 may traverse all thermal maps and/or airflow maps in the first set of simulation results 108. After the monitoring/control mechanism 110 is trained using all thermal maps and/or airflow maps in the first set of simulation results 108, the first round of training may finish.

After the first round of training, the monitoring/control mechanism 110 may be used to generate a set of extraordinary/emergent conditions 112. For example, an IDC in Seattle may usually experience cool weather. However, for a few days in a summer, Seattle may get very hot, for example, over 40° C., which has not happened for decades. The monitoring/control mechanism 110 may be able to simulate such unusual weather conditions. For another example, an AC in an IDC may shut down suddenly and unpredictably. The monitoring/control mechanism 110 may be able to simulate such emergent conditions. Also, the monitoring/control mechanism 110 may simulate emergencies such as power outage, electricity failure, and other scenarios impossible to be collected from the set of systems 102 because shutting down all the equipment to run a CFD analysis is not practical.

The simulation mechanism 106 may run a second simulation using the set of extraordinary/emergent conditions 112 to generate a second set of simulation results 114. The second set of simulation results 114 may include thermal maps and/or airflow maps under extraordinary/emergent conditions 112.

At the monitoring/control mechanism 110, a second round of training of the monitoring/control mechanism 110 may be conducted using the second set of simulation results 114. For example, the data 104 of the set of systems 102 and the second set of simulation results 108 may be used to train the monitoring/control mechanism 110. The data 104 of one IDC of the set of systems 102 may be used as the input of the monitoring/control mechanism 110. Then, the monitoring/control mechanism 110 may predict the thermal map and/or airflow map under the extraordinary/emergent conditions 112. Then, the predicted thermal map and/or airflow map under the extraordinary/emergent conditions 112 may be compared with the actual thermal map and/or airflow map extraordinary/emergent conditions 112 provided by the second set of simulation results 108 from the simulation mechanism 106. The difference between the predicted thermal map and/or airflow map under the extraordinary/emergent conditions 112 and the actual thermal map and/or airflow map under the extraordinary/emergent conditions 112 may be fed back to the input of the monitoring/control mechanism 110 to train the monitoring/control mechanism 110 in an iterative manner until an accuracy of the predicted thermal map and/or airflow map under the extraordinary/emergent conditions 112 is under a threshold. The threshold of accuracy may be adjusted by the user or the manufacturer as necessary. The second round of training of the monitoring/control mechanism 110 may traverse all thermal maps and/or airflow maps under the extraordinary/emergent conditions 112 in the second set of simulation results 108. After the monitoring/control mechanism 110 is trained using all thermal maps and/or airflow maps under the extraordinary/emergent conditions 112 in the second set of simulation results 114, the second round of training may finish.

After the second round of training, the monitoring/control mechanism 110 may be used to monitor a field system 118 with a space having at least one cooling element and at least one heat-generating element and to control the at least one cooling element and the at least one heat-generating element. Also, the monitoring/control mechanism 110 may be used to provide predictions and/or recommendations 116 to optimize the thermal control of field system 118. The field system may be a field IDC. The IDC is used as an example of the numerical systems hereinafter for the sake of description, rather than limiting the application to the IDC. The field IDC may refer to an actual IDC. The filed IDC may have a space including various heat-generating elements and/or cooling elements. Heat-generating elements may include servers, racks, computing nodes, storage devices, network devices, etc. Cooling elements may include air conditioning equipment, water pumps, fans, etc. The monitoring/control mechanism 110 may be deployed in the field system 118 or remotely.

For example, the data of the field system 118 such as the size of the space or room, the number of servers, the layout of the space or room, the environment temperature, the humidity, temperatures at a plurality of points in the space (which may be three dimensional or two dimensional), etc. may be collected to be used as the input of the monitoring/control mechanism 110. The monitoring/control mechanism 110 may predict thermal maps and/or airflow maps of the field system 118.

For example, when there is a cooling device at the bottom of a rack, there may be a hot spot/area on the top of the rack. When there is a cooling device at the top of a rack, there may be a hot spot/area on the bottom of the rack. When a server is busy, there may be a hot spot/area on the server. Since a hot spot/area may cause damages to the equipment, the cooling device near the hot spot/area may be turned up or on to lower the temperature of the hot spot/area. Also, the working load of the busy server may be rescheduled, or the frequency of the busy server may be lowered such that the server temperature may be lowered. When a server is not busy or at idle, there may be a cool spot/area on the server. In order to save energy, the cooling device near the cool spot/area may be turned down or off.

An acceptable temperature range, for example, from 22° C. to 40° C., may be predetermined and adjusted anytime by the user or the manufacturer. For spots/areas that are within the acceptable temperature range, the monitoring/control mechanism may keep monitoring such spots/areas. When the temperature has a tendency to rise, the monitoring/control mechanism 110 may send or present a precaution message to the field system 118 such that preliminary action may be taken to avoid the temperature from going too high. Spots/areas with the temperature of 40° C. or above may be identified as hot spots/areas, and spots/areas with the temperature of 22° C. or below may be identified as cool spots/areas. For the spots/areas outside the acceptable temperature range, for example, hot spots/areas and cool spots/areas, the monitoring/control mechanism 110 may suggest the field system 118 to take actions to avoid damages to the equipment or to save energy. For example, if there is a hot spot/area in the predicted thermal map and/or airflow map, the monitoring/control mechanism 110 may suggest the field system 118 to turn up or on the cooling device near the hot spot/area. If a server is very busy and generates too much heat, the monitoring/control mechanism 110 may suggest the field system 118 to reschedule the working load or to lower the frequency of the server such that the temperature of the server may be lowered. If there is a cool spot/area in the predicted thermal map and/or airflow map, the monitoring/control mechanism 110 may suggest the field system 118 to turn down or off the cooling device near the cool spot/area. As such, the thermal control of the field system 118 may be optimized.

The field system 118 may send feedback 120 to monitoring/control mechanism 110. Feedback 120 may include actual data collected from the field system 118 that may be used to verify the predictions and/or recommendations 116. The monitoring/control mechanism 110 may learn new knowledge from the feedback 120 from the field system 118. For example, there may be a scenario where the predicted thermal map and/or airflow map of the monitoring/control mechanism 110 does not match the real heat distribution of the field system 118. The monitoring/control mechanism may predict that a hot spot/area may be on top of a rack in the field system 118. However, the hot spot/area on top of the rack may not exist in the field system 118. In this case, the field system 118 may send errors to monitoring/control mechanism 110. The data contained in the feedback 120 may be used to train the monitoring/control mechanism for a third round such that monitoring/control mechanism 110 may be updated/tuned. The third round of training of the monitoring/control mechanism 110 may be conducted in a similar way to that of the first and the second round of training. The monitoring/control mechanism may be updated in an on-going manner as new rounds of trainings may be conducted anytime as necessary. The ever-updated monitoring/control mechanism 110 may provide better predictions and/or recommendations 116 to the field system 118.

The monitoring/control mechanism 110 may be updated/tuned by a provider that provides consulting service to the field system 118. The updating/tuning may refer to using actual data collected from the field system 118 to train monitoring/control mechanism 110 in a similar way to that of the first and the second round of training. The updating/tuning may be conducted with a one-off appointment/payment arrangement, or via a subscription mode through which the ongoing tuning may be provided. In this way, the monitoring/control mechanism 110 may keep learning during working for the field system 118. The first and the second round of training may be processes for the monitoring/control mechanism 110 to learn the knowledge about thermal maps and/or airflow maps of a given set of systems 102. Using the monitoring/control mechanism 110 to predict thermal maps and/or airflow maps of the field system 118 may be a process for the monitoring/control mechanism 110 to apply the knowledge. The updating/tuning of monitoring/control mechanism 110 may be a process for monitoring/control mechanism 110 to keep learning from feedback 120 of the field system 118 such that the monitoring/control mechanism 110 may provide a better prediction in an on-going way.

The monitoring/control mechanism 110 may send the feedback 120 to other parties (via a central point or in a peer-to-peer manner) such as a platform, a service center, a technical support department, a management department, an outside counsel, and other AI models. Hence, other parries may update their information.

Moreover, the monitoring/control mechanism 110 may provide predictions and/or recommendations 116 to the field system 118 in a real-time manner. For example, the field system 118 may turn up or on the cooling device near the hot spot/area as monitoring/control mechanism 110 suggested, and the temperature may go down below 22° C. after a while. Then, the monitoring/control mechanism 110 may suggest the field system 118 to turn down or off the cooling device. The field system 118 may reschedule the working load of the server or to lower the frequency of the server as suggested by the monitoring/control mechanism 110, and the temperature may go down below 22° C. after a while. Then, the monitoring/control mechanism 110 may suggest the field system 118 to turn down or off the cooling device. As such, the thermal control of the IDC may be optimized in a real-time manner. The monitoring/control mechanism 110 may provide predictions and/or recommendations 116 to the field system 118 periodically or on demand.

Moreover, the monitoring/control mechanism 110 may provide predictions and/or recommendations 116 to the field system 118 in a multi-dimensional manner. Multi-dimensional consideration may refer to taking extraordinary/emergent conditions into consideration. For example, a field IDC in Seattle may usually experience cool weather. However, for a few days in a summer, Seattle may get very hot, for example, over 40° C., which has not happened for decades. Data of the environmental temperature may be sent to the monitoring/control mechanism 110, which may predict the thermal map and/or airflow map of the field system 118 under the environmental temperature of 40° C. The monitoring/control mechanism 110 may suggest the field system 118 to turn up or on cooling devices near the hot spots/areas and turn down or off cooling devices near the cool spots/areas based on the predicted thermal map and/or airflow map. For example, an AC of the field system 118 may shut down suddenly and unpredictably. Data of location the AC may be sent to the monitoring/control mechanism 110, which may predict the thermal map and/or airflow map of the field system 118 with the AC shut down. The monitoring/control mechanism may suggest the field system 118 to turn up or on cooling devices near the hot spots/areas and turn down or off cooling devices near the cool spots/areas based on the predicted thermal map and/or airflow map. For example, when an unexpected power outage or electricity failure happens, the monitoring/control mechanism 110 may predict the thermal map and/or airflow map of the field system 118 under such condition and may provide predictions and/or recommendations 116 to the field system 118 to use the backup power to run the cooling device only at the hot spot/area without running all the cooling devices. When other extraordinary/emergent conditions occur, the monitoring/control mechanism 110 may also be able to provide predictions and/or recommendations 116 to the field system 118. As such, the thermal control of the IDC may be optimized in a multi-dimensional manner.

Moreover, modifications may occur in the field system 118, for example, a rack or server is added or removed, or an AC is added or removed. Data of such modifications may be sent to the monitoring/control mechanism 110 which may predict how the modifications affect the thermal map and/or airflow map of the field IDC 108, and where the cool spots/areas and hot spots/areas are. The monitoring/control mechanism 110 may provide predictions and/or recommendations 116 to the field system 118 based on the predicted thermal map and/or airflow map, for example, adding a cooling device near the added rack or server.

Moreover, systems and mechanisms discussed herein may include aspects and/or applications that are related to using artificial/simulated data and/or real-world data for training the monitoring/control mechanism. Also, the trained monitoring/control mechanism can be used for providing recommendations to a system about how to place various heat-generating elements and/or cooling elements, etc. The system may have a space including various heat-generating elements and/or cooling elements. Heat-generating elements may include servers, racks, computing nodes, storage devices, network devices, etc. Cooling elements may include air conditioning equipment, water pumps, fans, etc. For example, when designing such a system, a layout plan may be used as the input of the monitoring/control mechanism. The monitoring/control mechanism may predict the thermal map and/or airflow map and where the cool spots/areas and hot spots/areas are. The monitoring/control mechanism may provide predictions and/or recommendations to the field system based on the predicted thermal map and/or airflow map, for example, adding a cooling device near the added rack or server.

FIG. 2A-2D illustrate an example flowchart of a process 200 of establishing a monitoring/control mechanism which may be used for thermal control optimization of a field system.

At block 202, a set of systems 102 comprising a plurality of systems may be provided, where each of the plurality of systems includes at least one cooling element and at least one heat-generating element. Data 104 of the set of systems 102 may be collected. For example, the set of systems 102 may be a set of IDCs. The IDC is used as an example of the numerical systems hereinafter for the sake of description, rather than limiting the application to the IDC. The IDC may have a space including various heat-generating elements and/or cooling elements. Heat-generating elements may include servers, racks, computing nodes, storage devices, network devices, etc. Cooling elements may include air conditioning equipment, water pumps, fans, etc. The data of each of the set of IDCs may include typical settings in terms of a size of a space or room, number of servers, a layout of the space or room, environment temperature, humidity, temperatures at a plurality of points in the space (which may be three dimensional or two dimensional) etc. For example, a big IDC may have 105,000 servers with the room size of about 1000 m². There may be one level for laying out the servers, and another level for laying out the IT devices. A medium IDC may have 10,000 servers with the room size of about 500 m². A small IDC may have 500 servers with the room size of about 200 m². Also, other number of servers and other room sizes may be arranged. An IDC in humid weather may be in Huston. An IDC in cold weather may be in Chicago. An IDC in hot weather may be in Mexico City. Also, IDCs may be in other places and other weathers.

At block 204, a simulation mechanism 106 such as a CFD model may be established based on the data of the set of systems. The CFD model is used as an example of the numerical methods in fluid mechanics or fluid dynamics hereinafter for the sake of description, rather than limiting the application to the CFD model. For example, the simulation mechanism 106 may be established by any suitable software such as Solidworks, Ansys Fluent, and Simscale, based on the size of the space or room, the number of servers, the layout of the space or room, the environment temperature, the humidity, temperatures at a plurality of points in the space (which may be three dimensional or two dimensional). Then, the simulation mechanism 106 may run the first simulation to generate a first set of simulation results 108. The CFD may simulate how the airflow interacts with IDC equipment. For example, the first set of simulation results may include thermal maps and/or airflow maps and/or airflow map(s) of the set of systems 102, showing a three-dimensional or two-dimensional picture of the heat and/or airflow distribution. The simulation mechanism 106 may be deployed on-site in a system or may be located remotely.

At block 206, a monitoring/control mechanism 110 such as an AI model or a decision tree may be provided. For example, the monitoring/control mechanism 110 may include Convolutional Neural Networks (CNN), Recurrent Neural Networks (RNN), Long Short-Term Memory networks (LSTM), Reinforcement learning (RL) networks, Machine Learning (ML) networks, Deep Learning (DL) networks, or any combination thereof. The AI model is used as an example of the monitoring/control mechanism hereinafter for the sake of description, rather than limiting the application to the AI model. Also, other suitable monitoring/control mechanisms may be used.

At block 208, a first round of training of the monitoring/control mechanism 110 may be conducted using the data 104 of the set of systems 102 and/or the first set of simulation results 108.

At block 210, after the first round of training, the monitoring/control mechanism 110 may be used to generate a set of extraordinary/emergent conditions 112. The extraordinary/emergent conditions 112 may not be collected from the set of systems 102, because the extraordinary/emergent scenarios may occur once a few years or unpredictably. For example, an IDC in Seattle may usually experience cool weather. However, for a few days in a summer, Seattle may get very hot, for example, over 40° C., which has not happened for decades. The monitoring/control mechanism 110 may be able to simulate such unusual weather conditions. For another example, an AC in an IDC may shut down suddenly and unpredictably. The monitoring/control mechanism 110 may be able to simulate such emergent conditions. Also, the monitoring/control mechanism 110 may simulate emergencies such as power outage and other scenarios impossible to be collected from the set of systems 102 because shutting down all the equipment to run a CFD analysis is not practical.

At block 212, the simulation mechanism 106 may use the set of extraordinary/emergent thermal conditions 112 to run a second simulation to generate a second set of simulation results 114. The second set of simulation results 114 may include thermal maps and/or airflow maps under extraordinary/emergent conditions 112.

At block 214, a second round of training of the monitoring/control mechanism 110 may be conducted using the second set of simulation results 114.

At block 216, after the second round of training, the monitoring/control mechanism 110 may be used to monitor a field system 118 with a space having at least one cooling element and at least one heat-generating element and to control the at least one cooling element and the at least one heat-generating element. Also, the monitoring/control mechanism 110 may be used to provide predictions and/or recommendations 116 to optimize the thermal control of a field system 118. The field system may be a field IDC. The IDC is used as an example of the numerical systems hereinafter for the sake of description, rather than limiting the application to the IDC. The field IDC may refer to an actual IDC. The filed IDC may have a space including various heat-generating elements and/or cooling elements. Heat-generating elements may include servers, racks, computing nodes, storage devices, network devices, etc. Cooling elements may include air conditioning equipment, water pumps, fans, etc. The monitoring/control mechanism 110 may be deployed in the field system 118 or remotely.

For example, the data of the field system 118 such as the size of the space or room, the number of servers, the layout of the space or room, the environment temperature, the humidity, temperatures at a plurality of points in the space (which may be three dimensional or two dimensional), etc. may be collected to be used as the input of the monitoring/control mechanism 110. The monitoring/control mechanism 110 may predict thermal maps and/or airflow maps of the field system 118. For example, when there is a cooling device at the bottom of a rack, there may be a hot spot/area on the top of the rack. When there is a cooling device at the top of a rack, there may be a hot spot/area on the bottom of the rack. When a server is busy, there may be a hot spot/area on the server. Since a hot spot/area may cause damages to the equipment, the cooling device near the hot spot/area may be turned up or on to lower the temperature of the hot spot/area. Also, the working load of the busy server may be rescheduled, or the frequency of the busy server may be lowered such that the server temperature may be lowered. When a server is not busy or at idle, there may be a cool spot/area on the server. In order to save energy, the cooling device near the cool spot/area may be turned down or off.

An acceptable temperature range, for example, from 22° C. to 40° C., may be predetermined and adjusted anytime by the user or the manufacturer. For spots/areas that are within the acceptable temperature range, the monitoring/control mechanism may keep monitoring such spots/areas. When the temperature has a tendency to rise up, the monitoring/control mechanism 110 may send or present a precaution message to the field system 118 such that preliminary action may be taken to avoid the temperature from going too high. Spots/areas with the temperature of 40° C. or above may be identified as hot spots/areas, and spots/areas with the temperature of 22° C. or below may be identified as cool spots/areas. For the spots/areas outside the acceptable temperature range, for example, hot spots/areas and cool spots/ areas, the monitoring/control mechanism 110 may suggest the field system 118 to take actions to avoid damages to the equipment or to save energy. For example, if there is a hot spot/area in the predicted thermal map and/or airflow map, the monitoring/control mechanism 110 may suggest the field system 118 to turn up or on the cooling device near the hot spot/area. If a server is very busy and generates too much heat, the monitoring/control mechanism 110 may suggest the field system 118 to reschedule the working load or to lower the frequency of the server such that the temperature of the server may be lowered. If there is a cool spot/area in the predicted thermal map and/or airflow map, the monitoring/control mechanism 110 may suggest the field system 118 to turn down or off the cooling device near the cool spot/area. As such, the thermal control of the field system 118 may be optimized.

At block 218, the one or more IDCs 118 may send feedback 120 to the monitoring/control mechanism 110. Feedback 120 may include actual data of the field system 118 that may be used to verify the predictions and/or recommendations 116. The monitoring/control mechanism 110 may learn new knowledge from the feedback 120 from the field system 118. For example, there may be a scenario where the predicted thermal map and/or airflow map of monitoring/control mechanism does not match the real heat distribution of the field system 118. The monitoring/control mechanism may predict that a hot spot/area may be on top of a rack in the field system 118. However, the hot spot/area on top of the rack may not exist in the field system 118. In this case, the field system 118 may send the error as feedback to the monitoring/control mechanism 110. The data contained in the feedback 120 may be used to train the monitoring/control mechanism for a third round such that the monitoring/control mechanism 110 may be updated/tuned. The third round of training of the monitoring/control mechanism 110 may be conducted in a similar way to that of the first and the second round of training. The monitoring/control mechanism 110 may be updated in an on-going manner as new rounds of training may be conducted anytime as necessary. The ever-updated monitoring/control mechanism 110 may provide better predictions and/or recommendations 116 to the field system 118.

At block 220, the monitoring/control mechanism 110 may be updated/tuned based the feedback 120. The updating/tuning may refer to using actual data collected from the field system 118 to train the monitoring/control mechanism 110 in a similar way to that of the first and the second round of training. The updating/tuning may be conducted with a one-off appointment/payment arrangement, or via a subscription interface through which the ongoing tuning may be provided. In this way, the monitoring/control mechanism 110 may keep learning during working for the field system 118. The first and the second round of training may be processes for the monitoring/control mechanism 110 to learn the knowledge about thermal maps and/or airflow maps of a given set of systems 102. Using the monitoring/control mechanism 110 to predict thermal maps and/or airflow maps of the field system 118 may be a process for the monitoring/control mechanism 110 to apply the knowledge. The updating/tuning of the monitoring/control mechanism 110 may be a process for the monitoring/control mechanism 110 to keep learning from feedback of the field system 118 such that the monitoring/control mechanism 110 may provide a better prediction in an on-going way.

At block 222, the monitoring/control mechanism 110 may send feedback 120 to other parties (via a central point or in a peer-to-peer manner) such as a platform, a service center, a technical support department, a management department, an outside counsel, and other AI models. Hence, other parries may update their information.

Figure 2A:
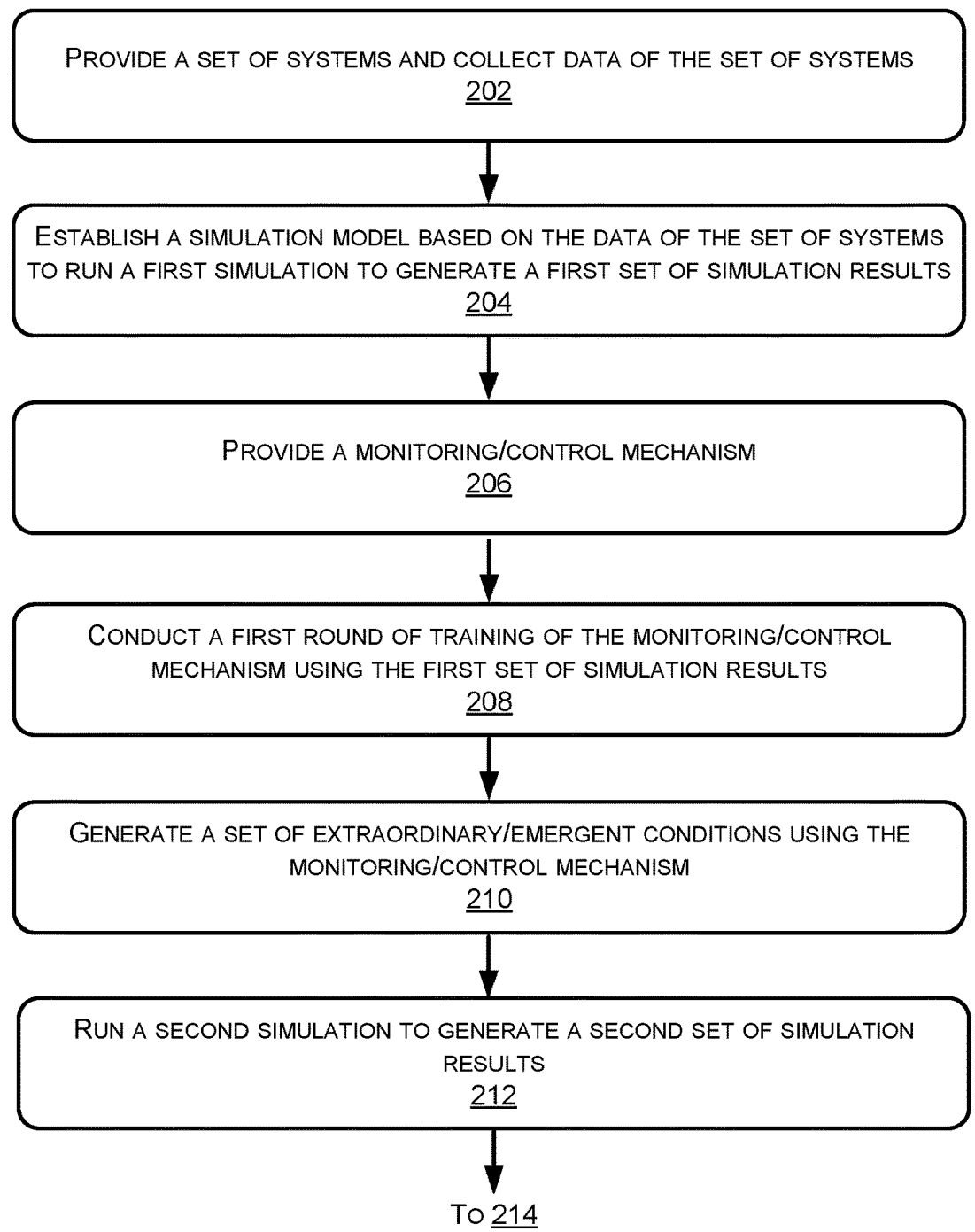
FIGS. 2A, 2B, 2C, and 2D illustrate an example flowchart of a process of establishing a monitoring/control mechanism which may be used for thermal control optimization of a field system.
Figure 2B:
Figure 2B:
Figure 2B:
Figure 2B:
Figure 2B:
Figure 2C:
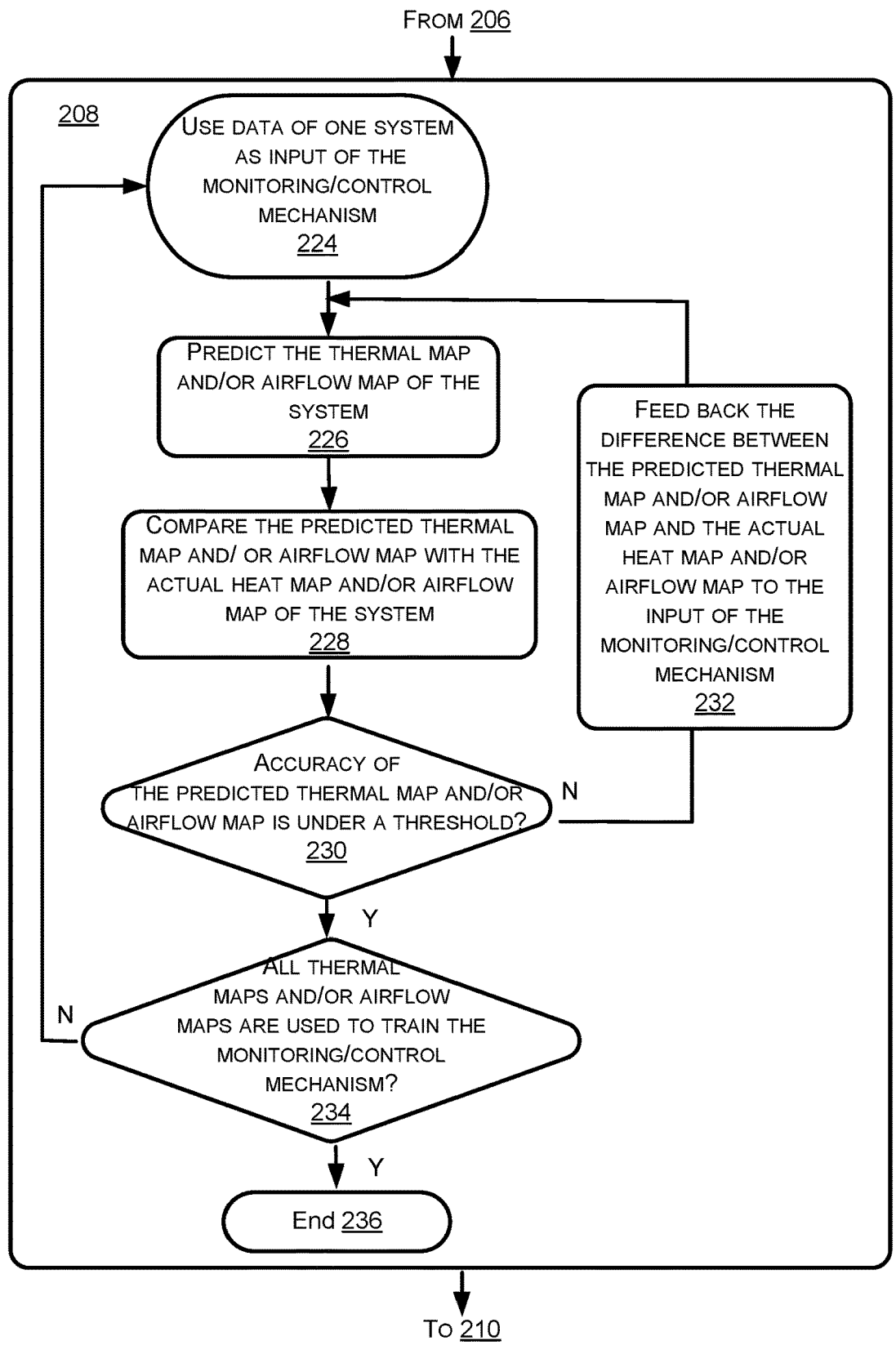

Referring to FIG. 2C, block 208 may include the following.

At block 224, the data 104 of one system of the set of systems 102 may be used as the input of the monitoring/control mechanism 110.

At block 226, the monitoring/control mechanism 110 may predict the thermal map and/or airflow map of the system and where the hot spots/areas and cool spots/areas are.

At block 228, the predicted thermal map and/or airflow map may be compared with the actual thermal map and/or airflow map of the system provided by the first set of simulation results 108 from the simulation mechanism 106.

At block 230, whether an accuracy of the predicted thermal map and/or airflow map is under a threshold may be determined. The threshold of accuracy may be adjusted by the user or the manufacturer as necessary.

At block 232, the difference between the predicted thermal map and/or airflow map and the actual thermal map and/or airflow map may be fed back to the input of the monitoring/control mechanism 110 to train the monitoring/control mechanism 110 in an iterative manner if the accuracy of the predicted thermal map and/or airflow map is not under the threshold.

At block 234, if the accuracy of the predicted thermal map and/or airflow map is under the threshold, whether all thermal maps and/or airflow maps in the first set of simulation results 108 are used to train the monitoring/control mechanism 110 may be determined. If yes, the first round of training may finish at bock 236. If no, the process may go back to block 224.

Systems and processes discussed herein may be used to improve the thermal efficiency of a system, for example, an IDC automatically in an on-going way without human intervention. Once the IDC is built, an operator of the IDC does not want to move around the equipment such as the server, the rack, and the cooling device, because they are too heavy. For example, a rack may have a weight of more than a ton. Systems and processes discussed herein may optimize the thermal control by adjusting the power level of IDC equipment. As such, the operator of the IDC may not need to move around the heavy equipment.

Moreover, when designing the floor plan or the layout of a system including various heat-generating elements and/or cooling elements, for example, a new IDC, systems and processes discussed herein may be used to provide recommendations for positioning equipment within the IDC prior to installation, repositioning equipment after construction and installation are complete, deployment of cooling devices such that the thermal efficiency of the IDC may be optimized.

Figure 2D:
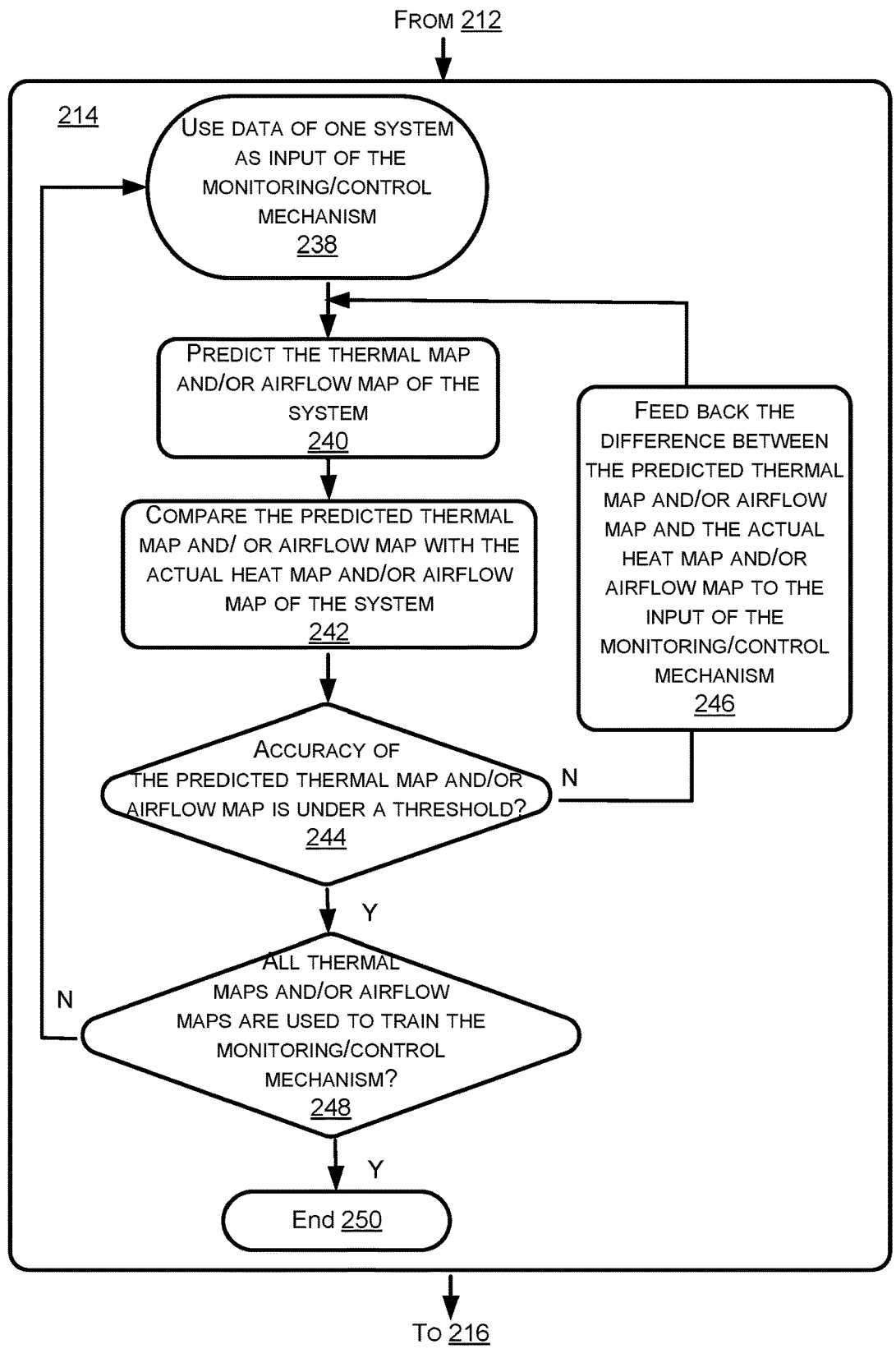

Referring to FIG. 2D, block 214 may include the following.

At block 238, the data 104 of one system of the set of systems 102 may be used as the input of the monitoring/control mechanism 110.

At block 240, the monitoring/control mechanism 110 may predict the thermal map and/or airflow map of the system under the extraordinary/emergent conditions 112.

At block 242, the predicted thermal map and/or airflow map under the extraordinary/emergent conditions 112 may be compared with the actual thermal map and/or airflow map extraordinary/emergent conditions 112 provided by the second set of simulation results 108 from the simulation mechanism 106.

At block 244, whether an accuracy of the predicted thermal map and/or airflow map under the extraordinary/emergent conditions 112 is under a threshold may be determined. The threshold of accuracy may be adjusted by the user or the manufacturer as necessary.

At block 246, the difference between the predicted thermal map and/or airflow map under the extraordinary/emergent conditions 112 and the actual thermal map and/or airflow map under the extraordinary/emergent conditions 112 may be fed back to the input of the monitoring/control mechanism 110 to train the monitoring/control mechanism 110 in an iterative manner if the accuracy of the predicted thermal map and/or airflow map is not under the threshold.

At block 248, if the accuracy of the predicted thermal map and/or airflow map is under the threshold, whether all thermal maps and/or airflow maps in the second set of simulation results 114 are used to train the monitoring/control mechanism 110 may be determined. If yes, the second round of training may finish at bock 250. If no, the process may go back to block 238.

Systems and processes discussed herein may not be limited to be used for IDCs and may be used in any suitable scenarios, for example, at a CPU level, a server level, or a rack level, in a car, a garage, a house, or a building.

Though the CFD model is s discussed herein, there may be other thermal analysis methods available. Apparatus and processes discussed herein are not limited to the CFD model/analysis. Any suitable thermal model/analysis may be used.

Figure 3A:
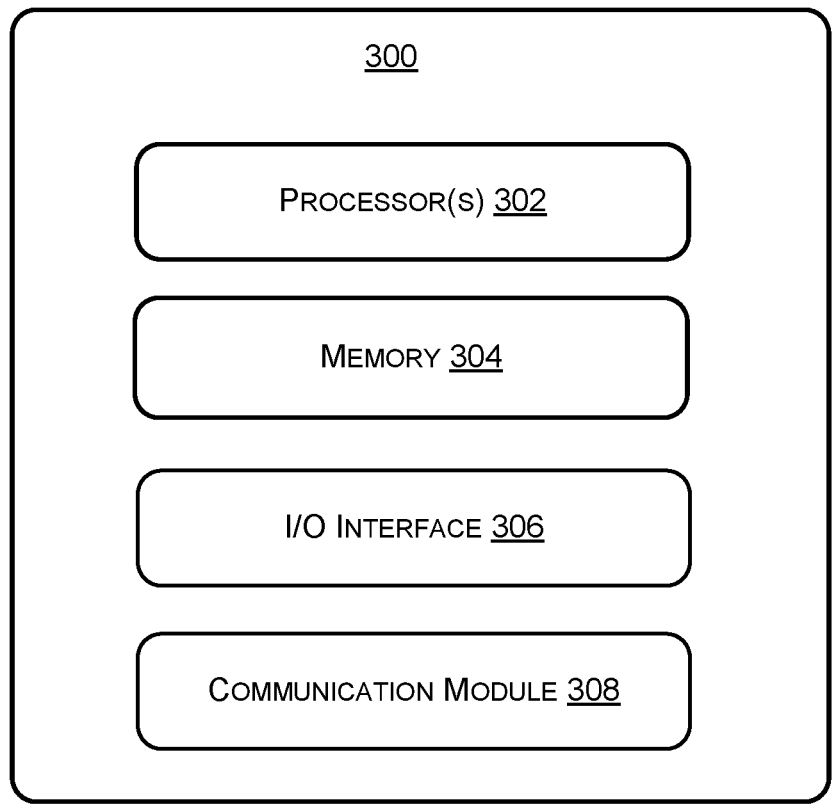
FIGS. 3A and 3B illustrate an example block diagram of an apparatus that implements systems and processes described with reference to FIGS. 1 and 2A-2D.
Figure 3B:
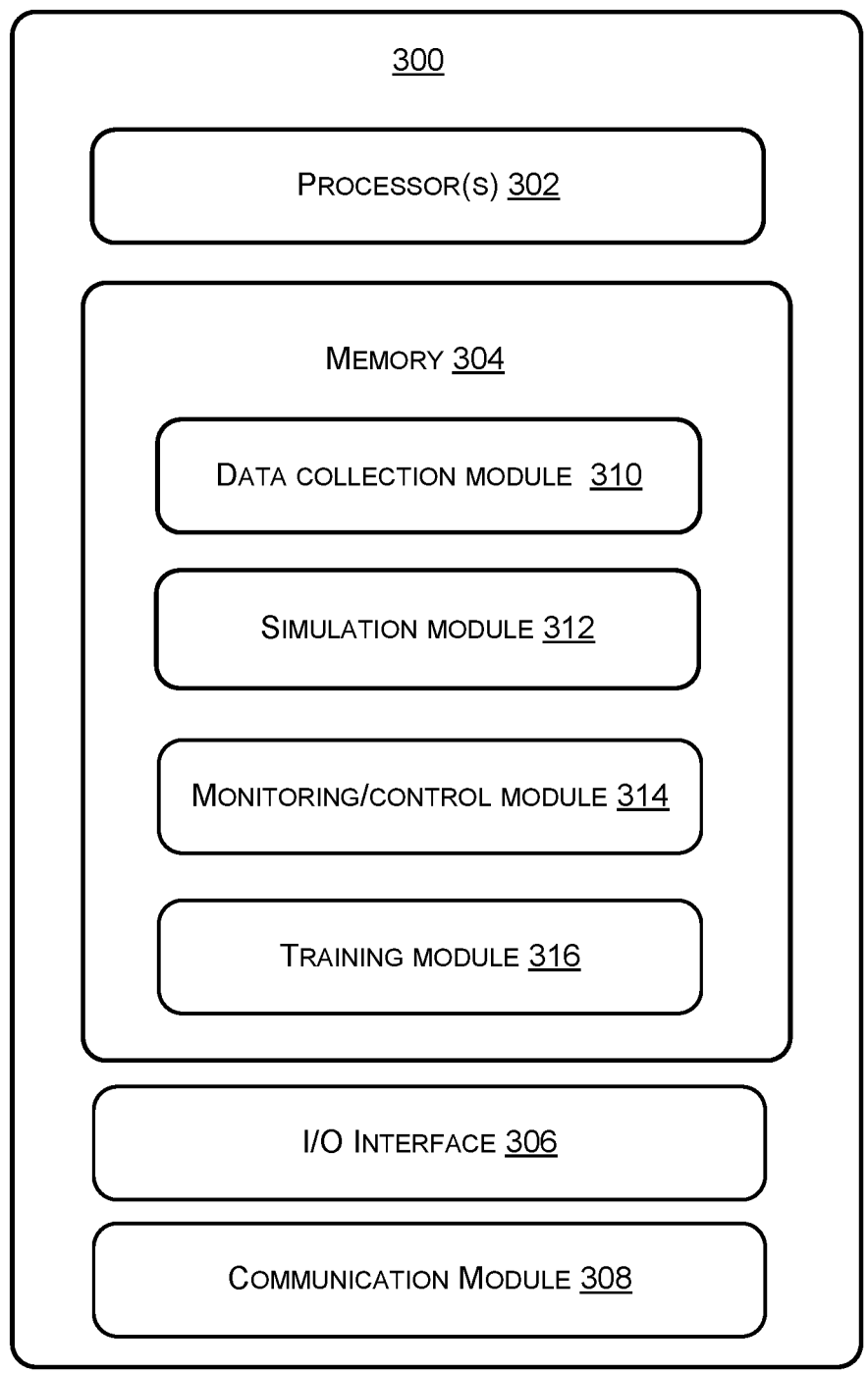

FIGS. 3A and 3B illustrates an example block diagram of an apparatus 300 that implements systems and processes described with reference to FIGS. 1 and 2A-2D.

The techniques and mechanisms described herein may be implemented by multiple instances of the apparatus 300 as well as by any other computing device, apparatus, and/or environment. The apparatus 300 shown in FIG. 3A is only one example of an apparatus and is not intended to suggest any limitation as to the scope of use or functionality of any computing device utilized to perform the processes and/or procedures described above. Other well-known computing devices, apparatuses, environments and/or configurations that may be suitable for use with the embodiments include, but are not limited to, driver/passenger computers, server computers, hand-held or laptop devices, multiprocessor apparatuses, microprocessor-based apparatuses, set-top boxes, game consoles, programmable consumer electronics, network PCs, minicomputers, mainframe computers, distributed computing environments that include any of the above apparatuses or devices, implementations using field programmable gate arrays ("FPGAs") and application specific integrated circuits ("ASICs"), and/or the like.

Referring to FIG. 3A, the apparatus 300 may include one or more processors 302 and memory 304 communicatively coupled to the processor(s) 302. The processor(s) 302 may execute one or more modules and/or processes to cause the processor(s) 302 to perform a variety of functions. In some embodiments, the processor(s) 302 may include a central processing unit (CPU), a graphics processing unit (GPU), both CPU and GPU, or other processing units or components known in the art. Additionally, each of the processor(s) 302 may possess its own local memory, which also may store program modules, program data, and/or one or more operating apparatuses.

Depending on the exact configuration and type of the apparatus 300, the memory 304 may be volatile, such as RAM, non-volatile, such as ROM, flash memory, miniature hard drive, memory card, and the like, or some combination thereof. The memory 304 may include computer-executable modules that are executable by the processor(s) 302, when executed by the processor(s) 302, cause the processor(s) 302 to implement systems and processes described with reference to FIGS. 1 and 2A-2D.

The apparatus 300 may additionally include an input/output (I/O) interface 306 for receiving and outputting data. The apparatus 300 may also include a communication module 308 allowing the apparatus 300 to communicate with other devices (not shown) over a network (not shown). The network may include the Internet, wired media such as a wired network or direct-wired connections, and wireless media such as acoustic, radio frequency (RF), infrared, and other wireless media.

Referring to FIG. 3B, modules stored on the memory 304 may include the following.

A data collection module 310 may be configured to collected data 104 a set of systems 102, where each of the set of systems 102 may include at least one cooling element and at least one heat-generating element as discussed above with reference to FIGS. 1 and 2A. For example, the set of systems 102 may be a set of IDCs. The IDC is used as an example of the numerical systems hereinafter for the sake of description, rather than limiting the application to the IDC. The IDC may have a space including various heat-generating elements and/or cooling elements. Heat-generating elements may include servers, racks, computing nodes, storage devices, network devices, etc. Cooling elements may include air conditioning equipment, water pumps, fans, etc. The data of each of the set of IDCs may include typical settings in terms of a size of a space or room, number of servers, a layout of the space or room, environment temperature, humidity, temperatures at a plurality of points in the space (which may be three dimensional or two dimensional) etc. For example, a big IDC may have 105,000 servers with the room size of about 1000 $m^2$. There may be one level for laying out the servers, and another level for laying out the IT devices. A medium IDC may have 10,000 servers with the room size of about 500 $m^2$. A small IDC may have 500 servers with the room size of about 200 $m^2$. Also, other number of servers and other room sizes may be arranged. An IDC in humid weather may be in Huston. An IDC in cold weather may be in Chicago. An IDC in hot weather may be in Mexico City. Also, IDCs may be in other places and under other weather conditions.

A simulation module 312 may be configured to provide simulation results based on the data 104 of the set of systems 102 as discussed above with reference to FIGS. 1 and 2A. The simulation module 312 may run the first simulation to generate a first set of simulation results 108. For example, the first set of simulation results 108 may include thermal maps and/or airflow maps and/or airflow map(s) of the set of systems 102, showing a three-dimensional or two-dimensional picture of the heat and/or airflow distribution.

A monitoring/control module 314 may be configured to monitor/control a field system 118 as discussed above with reference to FIGS. 1 and 2A. For example, the monitoring/control module 314 may include Convolutional Neural Networks (CNN), Recurrent Neural Networks (RNN), Long Short-Term Memory networks (LSTM), Reinforcement learning (RL) networks, Machine Learning (ML) networks, Deep Learning (DL) networks, or any combination thereof. The AI model is used as an example of the monitoring/control mechanism hereinafter for the sake of description, rather than limiting the application to the AI model.

A training module 316 may be configured to train the monitoring/control module 314 as discussed above with reference to FIGS. 1 and 2A. For example, the training module 316 may conduct a first round of training of the monitoring/control module 314 using the data 104 of the set of systems 102 and/or the first set of simulation results 108. For example, the data 104 of one system of the set of systems 102 may be used as the input of the monitoring/control module 314. Then, the monitoring/control module 314 may predict the thermal map and/or airflow map of the system and where the hot spots/areas and cool spots/areas are. Then, the predicted thermal map and/or airflow map may be compared with the actual thermal map and/or airflow map of the system provided by the first set of simulation results 108. If the predicted thermal map and/or airflow map is not accurate enough, the difference between the predicted thermal map and/or airflow map and the actual thermal map and/or airflow map may be fed back to the input of the monitoring/control module 314 to train the monitoring/control module 314 in an iterative manner until an accuracy of the predicted thermal map and/or airflow map is under a threshold. The threshold of accuracy may be adjusted by the user or the manufacturer as necessary. The first round of training of the monitoring/control module 314 may traverse all thermal maps and/or airflow maps in the first set of simulation results 108. After the monitoring/control module 314 is trained using all thermal maps and/or airflow maps in the first set of simulation results 108, the first round of training may finish.

After the first round of training, the monitoring/control module 314 may be further configured to generate a set of extraordinary/emergent conditions 112. The extraordinary/emergent conditions 112 may not be collected from the set of systems 102, because the extraordinary/emergent scenarios may occur once a few years or unpredictably. For example, an IDC in Seattle may usually experience cool weather. However, for a few days in a summer, Seattle gets very hot, for example, over 40° C., which has not happened for decades. The monitoring/control module 314 may be able to simulate such unusual weather conditions. For another example, an AC in an IDC may shut down suddenly and unpredictably. The monitoring/control module 314 may be able to simulate such emergent conditions. Also, the monitoring/control module 314 may simulate emergencies such as power outage and other scenarios impossible to be collected from the set of systems 102 because shutting down all the equipment to run a CFD analysis is not practical.

The simulation module 312 may be further configured to use the set of extraordinary/emergent thermal conditions 112 to run a second simulation to generate a second set of simulation results 114. The second set of simulation results 114 may include thermal maps and/or airflow maps under extraordinary/emergent conditions 112.

The training module 316 may be further configured to conduct a second round of training of the monitoring/control module 314 may be conducted using the second set of simulation results 114. For example, the data 104 of the set of systems 102 and the second set of simulation results 108 may be used to train the monitoring/control module 314. The data 104 of one IDC of the set of systems 102 may be used as the input of the monitoring/control module 314. Then, the monitoring/control module 314 may predict the thermal map and/or airflow map under the extraordinary/emergent conditions 112. Then, the predicted thermal map and/or airflow map under the extraordinary/emergent conditions 112 may be compared with the actual thermal map and/or airflow map extraordinary/emergent conditions 112 provided by the second set of simulation results 108 from the simulation mechanism 106. The difference between the predicted thermal map and/or airflow map under the extraordinary/emergent conditions 112 and the actual thermal map and/or airflow map under the extraordinary/emergent conditions 112 may be fed back to the input of the monitoring/control module 314 to train the monitoring/control module 314 in an iterative manner until an accuracy of the predicted thermal map and/or airflow map under the extraordinary/emergent conditions 112 is under a threshold. The threshold of accuracy may be adjusted by the user or the manufacturer as necessary. The second round of training of the monitoring/control module 314 may traverse all thermal maps and/or airflow maps under the extraordinary/emergent conditions 112 in the second set of simulation results 108. After the monitoring/control module 314 is trained using all thermal maps and/or airflow maps under the extraordinary/emergent conditions 112 in the second set of simulation results 114, the second round of training may finish.

After the second round of training, the monitoring/control module 314 may be further configured to monitor a field system 118 with a space having at least one cooling element and at least one heat-generating element and to control the at least one cooling element and the at least one heat-generating element. Also, the monitoring/control module 314 may be further configured to provide predictions and/or recommendations 116 to optimize the thermal control of field system 118. The field system may be a field IDC. The IDC is used as an example of the numerical systems hereinafter for the sake of description, rather than limiting the application to the IDC. The field IDC may refer to an actual IDC. The filed IDC may have a space including various heat-generating elements and/or cooling elements. Heat-generating elements may include servers, racks, computing nodes, storage devices, network devices, etc. Cooling elements may include air conditioning equipment, water pumps, fans, etc. The monitoring/control module 314 may be deployed in the field system 118 or remotely.

For example, the data of the field system 118 such as the size of the space or room, the number of servers, the layout of the space or room, the environment temperature, the humidity, temperatures at a plurality of points in the space (which may be three dimensional or two dimensional), etc. may be collected to be used as the input of the monitoring/control module 314. The monitoring/control module 314 may predict thermal maps and/or airflow maps of the field system 118.

For example, when there is a cooling device at the bottom of a rack, there may be a hot spot/area on the top of the rack. When there is a cooling device at the top of a rack, there may be a hot spot/area on the bottom of the rack. When a server is busy, there may be a hot spot/area on the server. Since a hot spot/area may cause damages to the equipment, the cooling device near the hot spot/area may be turned up or on to lower the temperature of the hot spot/area. Also, the working load of the busy server may be rescheduled, or the frequency of the busy server may be lowered such that the server temperature may be lowered. When a server is not busy or at idle, there may be a cool spot/area on the server. In order to save energy, the cooling device near the cool spot/area may be turned down or off.

An acceptable temperature range, for example, from 22° C. to 40° C., may be predetermined and adjusted anytime by the user or the manufacturer. For spots/areas that are within the acceptable temperature range, the monitoring/control mechanism may keep monitoring such spots/areas. When the temperature has a tendency to rise up, the monitoring/control module 314 may send or present a precaution message to the field system 118 such that preliminary action may be taken to avoid the temperature from going too high. Spots/areas with the temperature of 40° C. or above may be identified as hot spots/areas, and spots/areas with the temperature of 22° C. or below may be identified as cool spots/areas. For the spots/areas outside the acceptable temperature range, for example, hot spots/areas and cool spots/areas, the monitoring/control module 314 may suggest the field system 118 to take actions to avoid damages to the equipment or to save energy. For example, if there is a hot spot/area in the predicted thermal map and/or airflow map, the monitoring/control module 314 may suggest the field system 118 to turn up or on the cooling device near the hot spot/area. If a server is very busy and generates too much heat, the monitoring/control module 314 may suggest the field system 118 to reschedule the working load or to lower the frequency of the server such that the temperature of the server may be lowered. If there is a cool spot/area in the predicted thermal map and/or airflow map, the monitoring/control module 314 may suggest the field system 118 to turn down or off the cooling device near the cool spot/area. As such, the thermal control of the field system 118 may be optimized.

The monitoring/control module 314 may be further configured to receive feedback 120 from the field system 118. Feedback 120 may include actual data collected from the field system 118 that may be used to verify the predictions and/or recommendations 116. The monitoring/control module 314 may be further configured to learn new knowledge from the feedback 120 from the field system 118. For example, there may be a scenario where the predicted thermal map and/or airflow map of the monitoring/control module 314 does not match the real heat distribution of the field system 118. The monitoring/control module 314 may predict that a hot spot/area may be on top of a rack in the field system 118. However, the hot spot/area on top of the rack may not exist in the field system 118. In this case, the field system 118 may send errors to monitoring/control module 314. The data contained in the feedback 120 may be used to train the monitoring/control module 314 for a third round such that monitoring/control module 314 may be updated/tuned. The third round of training of the monitoring/control module 314 may be conducted by the training module 315 in a similar way to that of the first and the second round of training. The monitoring/control module 314 may be configured to be updated in an on-going manner as new rounds of trainings may be conducted anytime as necessary. The ever-updated monitoring/control module 314 may be configured to provide better predictions and/or recommendations 116 to the field system 118 after updating.

Further, systems and processes discussed herein may be used in a business model that offers service to an IDC owner and/or operator. The business model may provide a monitoring/control mechanism such as a trained monitoring/control mechanism or a decision tree to an IDC owner and/or operator to improve the thermal efficiency. This control/monitoring model may also provide consulting service that helps a given IDC to tune monitoring/control mechanism such as a trained monitoring/control mechanism or a decision tree. The tuning may be conducted with a one-off appointment/payment arrangement or based on a subscription model through which ongoing tuning may be provided.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various apparatus configurations, including single-processor or multiprocessor apparatuses, minicomputers, mainframe computers, driver/passenger computers, hand-held computing devices, microprocessor-based, programmable consumer electronics, combinations thereof, and the like.

The computer-readable storage media may include volatile memory (such as random access memory (RAM)) and/or non-volatile memory (such as read-only memory (ROM), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 1-3B. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Example Clauses

Clause 1. A method comprising: collecting data of a plurality of systems, each of the plurality of systems including at least one first cooling element and at least one first heat-generating element; conducting a first simulation using a simulation model based on the collected data to generate a first set of simulation results; conducting a first training on a control system using the first set of simulation results to obtain a first trained control system; and using the first trained control system to monitor a field system with a space having at least one second cooling element and at least one second heat-generating element and to control the at least one second cooling element and the at least one second heat-generating element.

Clause 2. The method of clause 1, wherein after conducting the first training on the control system using the first set of simulation results to obtain the trained control system, the method further comprises: generating a set of conditions using the first trained control system; sending the set of conditions to the simulation model; conducting a second simulation using the simulation model based on the set of conditions to obtain a second set of simulation results; conducting a second training on the first trained control system using the second set of simulation results to obtain a second trained control system; and using the second trained control system to monitor the field system with the space having the at least one second cooling element and the at least one second heat-generating element and to control the at least one second cooling element and the at least one second heat-generating element.

Clause 3. The method of clause 2, further comprising: receiving feedback data from the field system with the space having the at least one second cooling element and the at least one second heat-generating element; and updating the second trained control system by conducting additional training on the second trained control system using the feedback data.

Clause 4. The method of clause 1, wherein the simulation model comprises a Computational Fluid Dynamics (CFD) model.

Clause 5. The method of clause 1, wherein: the first set of simulation results includes a first set of thermal maps and/or airflow maps; and the second set of simulation results includes a second set of thermal maps and/or airflow maps.

Clause 6. The method of clause 1, wherein the plurality of systems comprises one or more of a computing device, a server, a rack of servers, or an Internet Data Center (IDC).

Clause 7. The method of clause 1, wherein the control system comprises one or more of a Convolutional Neural Network (CNN), a Recurrent Neural Network (RNN), a Long Short-Term Memory network (LSTM), a Reinforcement learning (RL) network, a Machine Learning (ML) network, a Deep Learning (DL) network, or a decision tree.

Clause 8. A computer-readable storage medium storing computer-readable instructions that, when executed by one or more processors, cause the one or more processors to perform acts comprising: collecting data of one or more systems, each of one or more systems including at least one first cooling element and at least one first heat-generating element; conducting a first simulation using a simulation model based on the collected data to generate a first set of simulation results; obtaining a trained control system through training using the first set of simulation results; and using the first trained control system to provide first recommendations to a field system with a space having at least one second cooling element and at least one second heat-generating element for controlling the at least one second cooling element and the at least one second heat-generating element.

Clause 9. The computer-readable storage medium of clause 8, wherein the acts further comprise: generating a set of conditions using the first trained control system; sending the set of conditions to the simulation model; conducting a second simulation using the simulation model based on the set of conditions to obtain a second set of simulation results; obtaining a second trained control system by performing training on the first trained control system using the second set of simulation results; and using the second trained control system to provide second recommendations to the field system for controlling the at least one second cooling element and the at least one second heat-generating element.

Clause 10. The computer-readable storage medium of clause 9, wherein the acts further comprise: receiving feedback data from the field system with the space having the at least one second cooling element and the at least one second heat-generating element; and updating the second trained control system by conducting additional training on the second trained control system using the feedback data.

Clause 11. The computer-readable storage medium of clause 8, wherein the simulation model comprises a Computational Fluid Dynamics (CFD) model.

Clause 12. The computer-readable storage medium of clause 8, wherein: the first set of simulation results includes a first set of thermal maps and/or airflow maps; and the second set of simulation results includes a second set of thermal maps and/or airflow maps.

Clause 13. The computer-readable storage medium of clause 8, wherein the one or more systems comprise one or more of a computing device, a server, a rack of servers, or an Internet Data Center (IDC).

Clause 14. The computer-readable storage medium of clause 8, wherein the control system comprises a Convolutional Neural Network (CNN), a Recurrent Neural Network (RNN), a Long Short-Term Memory network (LSTM), a Reinforcement learning (RL) network, a Machine Learning (ML) network, a Deep Learning (DL) network, or a decision tree.

Clause 15. An apparatus comprising: one or more processors; and memory coupled to the one or more processors, the memory storing computer-executable modules that, when executed by the one or more processors cause the one or more processors to perform acts, the modules comprising: a data collection module configured to collect data of a plurality of systems, each of the plurality of systems including at least one first cooling element and at least one first heat-generating element; conducting a first simulation using a simulation model based on the collected data to generate a first set of simulation results; a training module configured to conduct a first training on a control module using the first set of simulation results; and the control module configured to monitor a field system with a space having at least one second cooling element and at least one second heat-generating element and to provide recommendations to the field system for controlling the at least one second cooling element and the at least one second heat-generating element.

Clause 16. The apparatus of clause 15, wherein the training module is further configured to conduct a second training on the control module.

Clause 17. The apparatus of clause 16, wherein the control module is further configured to receive feedback data from the field system.

Clause 18. The apparatus of clause 15, wherein the simulation module comprises a Computational Fluid Dynamics (CFD) model.

Clause 19. The apparatus of clause 15, wherein the set of simulation results includes a set of thermal maps and/or airflow maps.

Clause 20. The apparatus of clause 15, wherein each of the plurality of systems comprises at least one of one or more computing devices, one or more servers, one or more racks of servers, and one or more Internet Data Centers (IDCs).

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   collecting data of a plurality of systems, each of the plurality of systems including at least one first cooling element and at least one first heat-generating element;
   conducting a first simulation using a simulation model based on the collected data to generate a first set of simulation results;
   conducting a first training on a control system to obtain a first trained control system based on the first set of simulation results and a result generated by the simulation model based on the collected data;
   using the first trained control system to monitor a field system with a space having at least one second cooling element and at least one second heat-generating element and to control the at least one second cooling element and the at least one second heat-generating element;
   generating a set of conditions using the first trained control system, the set of conditions including an extraordinary condition;
   sending the set of conditions to the simulation model;
   conducting a second simulation using the simulation model based on the set of conditions to obtain a second set of simulation results;
   conducting a second training on the first trained control system to obtain a second trained control system based on the second set of simulation results and feedbacks from the field system; and
   using the second trained control system to monitor the field system with the space having the at least one second cooling element and the at least one second heat-generating element and to control the at least one second cooling element and the at least one second heat-generating element.

2. The method of claim 1, further comprising:
   receiving feedback data from the field system with the space having the at least one second cooling element and the at least one second heat-generating element; and
   updating the second trained control system by conducting an additional training on the second trained control system using the feedback data.

3. The method of claim 1, wherein the simulation model comprises a Computational Fluid Dynamics (CFD) model.

4. The method of claim 1, wherein:
   the first set of simulation results includes a first set of thermal maps and/or airflow maps; and
   the second set of simulation results includes a second set of thermal maps and/or airflow maps.

5. The method of claim 1, wherein the plurality of systems comprises one or more of a computing device, a server, a rack of servers, or an Internet Data Center (IDC).

6. The method of claim 1, wherein the control system comprises one or more of a Convolutional Neural Network (CNN), a Recurrent Neural Network (RNN), a Long Short-Term Memory network (LSTM), a Reinforcement learning (RL) network, a Machine Learning (ML) network, a Deep Learning (DL) network, or a decision tree.

7. A computer-readable storage medium storing computer-readable instructions that, when executed by one or more processors, cause the one or more processors to perform acts comprising:
   collecting data of one or more systems, each of the one or more systems including at least one first cooling element and at least one first heat-generating element;
   conducting a first simulation using a simulation model based on the collected data to generate a first set of simulation results;
   conducting a first training on a control system to obtain a first trained control system based on the first set of simulation results and a result generated by the simulation model based on the collected data;
   using the first trained control system to monitor a field system with a space having at least one second cooling element and at least one second heat-generating element and to control the at least one second cooling element and the at least one second heat-generating element;
   generating a set of conditions using the first trained control system;
   sending the set of conditions to the simulation model;
   conducting a second simulation using the simulation model based on the set of conditions to obtain a second set of simulation results;
   conducting a second training on the first trained control system to obtain a second trained control system based on the second set of simulation results and feedbacks from the field system; and
   using the second trained control system to monitor the field system with the space having the at least one second cooling element and the at least one second heat-generating element and to control the at least one second cooling element and the at least one second heat-generating element.

8. The computer-readable storage medium of claim 7, wherein the acts further comprise:
   receiving feedback data from the field system with the space having the at least one second cooling element and the at least one second heat-generating element; and
   updating the second trained control system by conducting an additional training on the second trained control system using the feedback data.

9. The computer-readable storage medium of claim 7, wherein the simulation model comprises a Computational Fluid Dynamics (CFD) model.

10. The computer-readable storage medium of claim 7, wherein:
    the first set of simulation results includes a first set of thermal maps and/or airflow maps; and
    the second set of simulation results includes a second set of thermal maps and/or airflow maps.

11. The computer-readable storage medium of claim 7, wherein
    the one or more systems comprise one or more of a computing device, a server, a rack of servers, or an Internet Data Center (IDC).

12. The computer-readable storage medium of claim 7, wherein the control system comprises a Convolutional Neural Network (CNN), a Recurrent Neural Network (RNN), a Long Short-Term Memory network (LSTM), a Reinforcement learning (RL) network, a Machine Learning (ML) network, a Deep Learning (DL) network, or a decision tree.

13. An apparatus comprising:
    one or more processors; and memory coupled to the one or more processors, the memory storing computer-executable modules that, when executed by the one or more processors, perform acts comprising:

collecting data of one or more systems, each of the one or more systems including at least one first cooling element and at least one first heat-generating element;

conducting a first simulation using a simulation model based on the collected data to generate a first set of simulation results;

conducting a first training on a control system to obtain a first trained control system based on the first set of simulation results and a result generated by the simulation model based on the collected data;

using the first trained control system to monitor a field system with a space having at least one second cooling element and at least one second heat-generating element and to control the at least one second cooling element and the at least one second heat-generating element;

generating a set of conditions using the first trained control system;

sending the set of conditions to the simulation model;

conducting a second simulation using the simulation model based on the set of conditions to obtain a second set of simulation results;

conducting a second training on the first trained control system to obtain a second trained control system based on the second set of simulation results and feedbacks from the field system; and using the second trained control system to monitor the field system with the space having the at least one second cooling element and the at least one second heat-generating element and to control the at least one second cooling element and the at least one second heat-generating element.

14. The apparatus of claim 13, wherein the acts further comprise receiving feedback data from the field system.

15. The apparatus of claim 13, wherein the simulation model comprises a Computational Fluid Dynamics (CFD) model.

16. The apparatus of claim 13, wherein:
the first set of simulation results includes a ifrst set of thermal maps and/or airflow maps; and
the second set of simulation results includes a second set of thermal maps and/or airflow maps.

17. The apparatus of claim 13, wherein each of the one or more systems comprises at least one of one or more computing devices, one or more servers, one or more racks of servers, and one or more Internet Data Centers (IDCs).

18. The method of claim 1, wherein the set of conditions further include an emergent condition.

19. The computer-readable storage medium of claim 7, wherein the set of conditions include an extraordinary condition or an emergent condition.

20. The apparatus of claim 13, wherein the set of conditions include an extraordinary condition or an emergent condition.

* * * * *